(12) United States Patent
Snead

(10) Patent No.: US 9,266,198 B1
(45) Date of Patent: Feb. 23, 2016

(54) CART FOR WELDING OPERATION

(71) Applicant: LINCOLN GLOBAL, INC., City of Industry, CA (US)

(72) Inventor: Jamil Snead, San Diego, CA (US)

(73) Assignee: Lincoln Global, Inc., City of Industry, CA (US)

( * ) Notice: Subject to any disclaimer, the term of this patent is extended or adjusted under 35 U.S.C. 154(b) by 0 days.

(21) Appl. No.: 14/478,924

(22) Filed: Sep. 5, 2014

(51) Int. Cl.
*B23K 37/00* (2006.01)
*B23K 37/02* (2006.01)

(52) U.S. Cl.
CPC ......... *B23K 37/0211* (2013.01); *B23K 37/0247* (2013.01); *B23K 37/0264* (2013.01); *B23K 37/0282* (2013.01)

(58) Field of Classification Search
None
See application file for complete search history.

(56) References Cited

U.S. PATENT DOCUMENTS

| | | | | | |
|---|---|---|---|---|---|
| 1,852,412 | A | * | 4/1932 | Hickey | B23K 7/006 266/56 |
| 1,879,346 | A | * | 9/1932 | Lawrence | B23K 7/006 148/201 |
| 1,912,362 | A | * | 6/1933 | Coberly | B23K 7/006 266/144 |
| 2,289,968 | A | * | 7/1942 | Jones | B23K 7/003 148/201 |
| 2,293,853 | A | * | 8/1942 | Rountree | B23K 7/0229 266/68 |
| 2,357,376 | A | * | 9/1944 | Baird | B23K 37/0223 219/124.22 |
| 2,403,514 | A | * | 7/1946 | Franzen | B23K 7/001 266/58 |
| 2,587,461 | A | * | 2/1952 | Gatimel | B23K 7/107 266/58 |
| 2,620,421 | A | * | 12/1952 | Matosec | B23K 9/02 219/124.32 |
| 2,647,319 | A | * | 8/1953 | Grubich | B23K 7/007 266/57 |
| 2,777,685 | A | * | 1/1957 | Colson | B23K 37/0205 266/66 |
| 3,201,561 | A | * | 8/1965 | Damon | B23K 37/02 219/124.31 |
| 3,291,470 | A | * | 12/1966 | Lotz | B22D 11/126 164/263 |

(Continued)

FOREIGN PATENT DOCUMENTS

| | | | |
|---|---|---|---|
| CA | 2358279 A1 | 4/2003 | |
| GB | 566908 A * | 1/1945 | ............. B23K 37/02 |

(Continued)

OTHER PUBLICATIONS

Gecko—Compact Welding Carriage, http://www.promotech.eu/products/index/show/welding_cutting.gecko.

(Continued)

*Primary Examiner* — Kiley Stoner
(74) *Attorney, Agent, or Firm* — Hahn Loeser & Parks LLP

(57) ABSTRACT

A cart adapted to perform a welding operation on a workpiece, the cart including a moving platform; a first slide supported on the moving platform defining a first slide plane; a second slide pivotally attached to moving platform, the second slide defining a second slide plane; a second clamp engagable with the second slide to hold a pivotal position of the second slide at a selected slide angle relative to the moving platform; an implement supported on the first slide and second slide, wherein operation of the first slide and the second slide move the implement to a selected position relative to the workpiece.

23 Claims, 6 Drawing Sheets

(56) References Cited

U.S. PATENT DOCUMENTS

| | | | | |
|---|---|---|---|---|
| 3,596,048 | A | * | 7/1971 | Maeda .................. B23K 37/02 219/124.31 |
| 3,753,525 | A | * | 8/1973 | Homes ................. B23K 9/0286 219/59.1 |
| 3,764,777 | A | * | 10/1973 | Sakabe ............. B23K 37/0264 219/124.31 |
| 3,779,444 | A | * | 12/1973 | Kensrue ............... B23K 9/0256 219/124.31 |
| 3,806,691 | A | * | 4/1974 | Roach ..................... B23H 7/26 219/69.11 |
| 3,935,420 | A | | 1/1976 | Sandstrom |
| 4,010,346 | A | * | 3/1977 | Cecil ...................... B23K 37/02 219/124.34 |
| 4,101,755 | A | * | 7/1978 | Uratani .................. B23K 37/02 219/124.31 |
| 4,132,338 | A | * | 1/1979 | Bove ................. B23K 37/0217 219/125.11 |
| 4,162,383 | A | * | 7/1979 | Hamasaki .............. B23K 7/006 219/125.11 |
| 4,744,855 | A | | 5/1988 | Ellenberger et al. |
| 5,302,799 | A | * | 4/1994 | Kennedy ................ B23K 9/127 219/124.34 |
| 5,443,199 | A | * | 8/1995 | Krumszyn ........... B23K 9/0286 228/29 |
| 6,713,710 | B1 | * | 3/2004 | Zhang ................. B23K 9/0352 219/121.34 |
| 6,917,013 | B2 | | 7/2005 | Kondo |
| 7,745,757 | B2 | | 6/2010 | Enyedy et al. |
| 8,089,024 | B2 | * | 1/2012 | Forlong .................. B23K 7/06 219/121.39 |
| 2004/0026390 | A1 | * | 2/2004 | Kondo ..................... B23K 9/02 219/124.34 |
| 2004/0256369 | A1 | * | 12/2004 | Kondo .................. B23K 9/127 219/125.12 |
| 2006/0144835 | A1 | * | 7/2006 | Pan ........................ B23K 9/127 219/124.34 |
| 2010/0176106 | A1 | * | 7/2010 | Christensen ....... B23K 37/0264 219/137 R |
| 2010/0213242 | A1 | * | 8/2010 | Fujimoto ........... B23K 20/1245 228/2.1 |
| 2014/0374391 | A1 | * | 12/2014 | Cole ................... B23K 9/0956 219/121.45 |
| 2014/0374393 | A1 | * | 12/2014 | Battheu .............. B23K 37/0235 219/121.67 |
| 2015/0165540 | A1 | * | 6/2015 | Cole .................... B23K 9/0008 219/76.14 |

FOREIGN PATENT DOCUMENTS

| | | | | |
|---|---|---|---|---|
| JP | 01005664 | A | * | 1/1989 |
| JP | EP 0367850 | A1 | * | 5/1990 ............... B23K 9/02 |
| JP | 04237566 | A | | 8/1992 |
| JP | 07185812 | A | | 7/1995 |
| KR | DE 19605651 | C1 | * | 2/1997 ......... B23K 37/0229 |
| KR | 100902142 | B1 | | 6/2009 |
| KR | 20090073595 | A | | 7/2009 |
| KR | 20140023719 | A | | 2/2014 |
| KR | 20140033735 | A | | 3/2014 |
| WO | WO 2012165749 | A1 | * | 12/2012 ........... B23K 9/1274 |
| WO | WO 2013002068 | A1 | * | 1/2013 ............... B23K 7/00 |
| WO | 2014015976 | A1 | | 1/2014 |
| WO | WO 2014119613 | A1 | * | 8/2014 ........... B23K 9/0052 |

OTHER PUBLICATIONS

Bug-O Systems, K-Bug 3000, Digital compact Heavy Duty Fillet Welder.

* cited by examiner

CART FOR WELDING OPERATION

TECHNICAL FIELD

The present invention relates to a cart that includes a moving platform that holds an implement for performing a welding operation on a workpiece. More particularly, the present invention relates to a moving platform that includes a positioning assembly that provides a first slide and a second slide where the angular position of the second slide is adjustable allowing precise adjustment of contact tip to work piece distance of the implement relative to the workpiece.

SUMMARY OF THE INVENTION

The present invention generally provides a cart for performing a welding operation on a workpiece, the cart including a moving platform; a first slide supported on the moving platform defining a first slide plane; a second slide pivotally attached to moving platform, the second slide defining a second slide plane; a second clamp engagable with the second slide to hold a pivotal position of the second slide at a selected slide angle relative to the moving platform; an implement supported on the first slide and second slide, wherein operation of the first slide and the second slide move the implement to a selected position relative to the workpiece.

The present invention further provides cart adapted to weld a joint between a first workpiece and a second workpiece oriented at an angle to the first workpiece, the cart including a moving platform; a first slide supported on the moving platform, the first slide defining a first slide plane; a second slide pivotally attached to the first slide, the second slide defining a second slide plane; a second clamp engagable with the second slide to hold a pivotal position of the second slide at a selected slide angle relative to the moving platform; an implement defining an implement axis, the implement being supported on the second slide, wherein the implement is movable to a selected position along the first slide plane and second slide plane by operation of the first slide and second slide; wherein the slide angle is aligned with the implement axis, and wherein movement along the second slide plane with the slide angle aligned with the implement axis adjusts a contact tip to work distance.

The present invention further provides a cart adapted to perform a welding operation on a joint between a first workpiece and a second workpiece oriented at an angle to the first workpiece, the cart including a moving platform; a first slide supported on the moving platform and fixed in a horizontal position; a second slide pivotally attached to the first slide, the second slide defining a second slide plane; a second clamp engagable with the second slide to hold a pivotal position of the second slide at a selected slide angle relative to the first slide; an implement defining an implement axis, the implement being supported on the second slide, wherein the implement includes a welding torch having a contact tip adapted to apply a weld to the joint, wherein operation of the first slide adjusts a position of the contact tip in the first plane and operation of the second slide adjusts the position of the contact tip in the second plane, and wherein the slide angle is selected to align it parallel to the implement axis to provide a contact tip to work distance adjustment by operation of the second slide.

DETAILED DESCRIPTION OF THE INVENTION

An implement cart according to the invention includes a moving platform that supports an implement adapted to perform a welding operation. A "welding operation" includes but is not limited to welding, brazing, soldering, coating, hardfacing, and cutting. The implement may include a laser, a waterjet, flame or arc generating torch or other system used in performing a welding operation. The implement may be mounted directly to the platform or contained within a separate component that is attached to the platform. In general, the cart moves the implement relative to a workpiece to perform the welding operation. In the example shown, the workpiece includes a first workpiece WP1 and a second workpiece WP2 that are arranged at an angle 8 relative to each other including but not limited to the 90 degree angle shown. It will be understood that the depicted workpiece is provided as one example and is not limiting.

Figure 7:
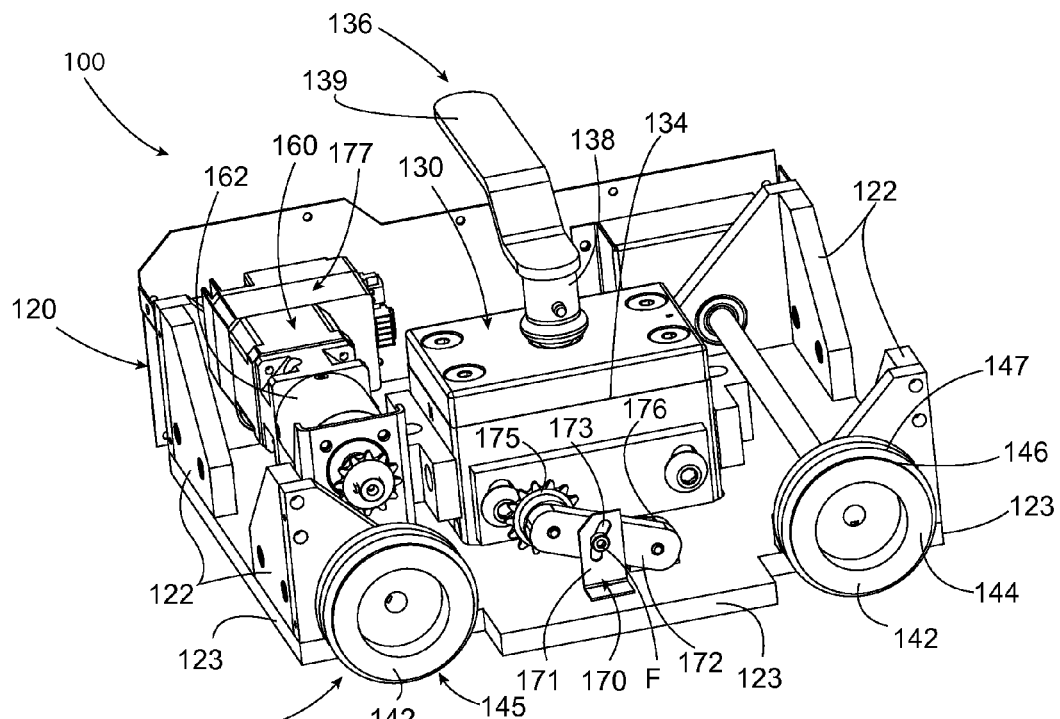
FIG. 7 is a perspective of the welding cart with the cover and welding torch assembly removed to show details of the drive assembly.

One example of a cart is depicted in the accompanying drawings and referred to by the number 100. Cart 100 generally includes a moving platform 120. Moving platform 120 may have any shape or form suitable for supporting a welder 180 described more completely below. Moving platform 120 may include one or more frame components. In the example shown, moving platform 120 has a floor 121 to support various components. A housing or shroud 125 may be attached to floor 121 to cover these components and provide a surface to which the welder 180 is mounted as described more completely below. As best shown in FIG. 7, floor 121 is generally rectangular in shape and includes housing brackets 122 at its periphery 123 to facilitate attachment of the housing 125 to floor 121.

Moving platform 120 optionally includes a platform holder, generally indicated by the number 130. Platform holder 130 is adapted to develop a force to hold the moving platform at a selected distance from the work piece W. For example, platform holder may include any mechanism that pulls the moving platform toward the work piece including but not limited to a passive magnet, such as a permanent magnet material, active magnet, such as an electro-magnet, a pump used to develop a differential force, such as an impeller or vacuum pump. In certain embodiments, moving platform holder 130 develops a force to hold moving platform 120 to the work piece WP and counteract forces tending to pull moving platform 120 away from a work piece WP, such as, for example, a buoyant force or gravitational force. In the example shown, a permanent magnet such as a neodymium magnet is used.

Figure 6:
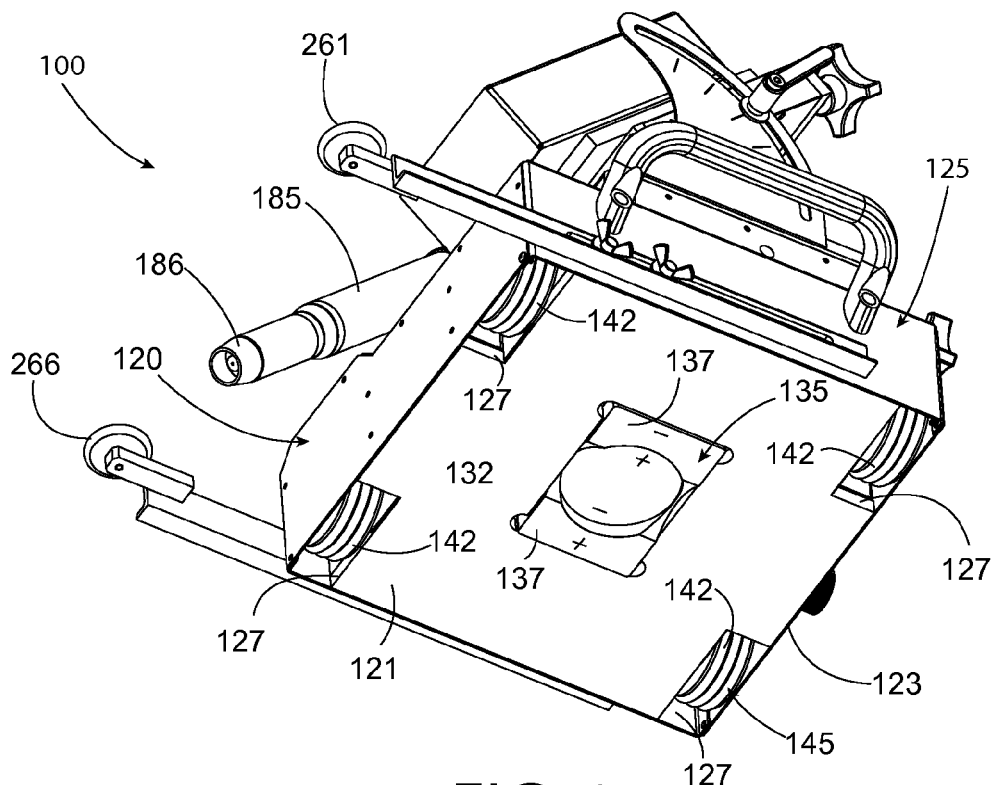
FIG. 6 is a bottom perspective view of a welding cart according to the invention.
Figure 8:
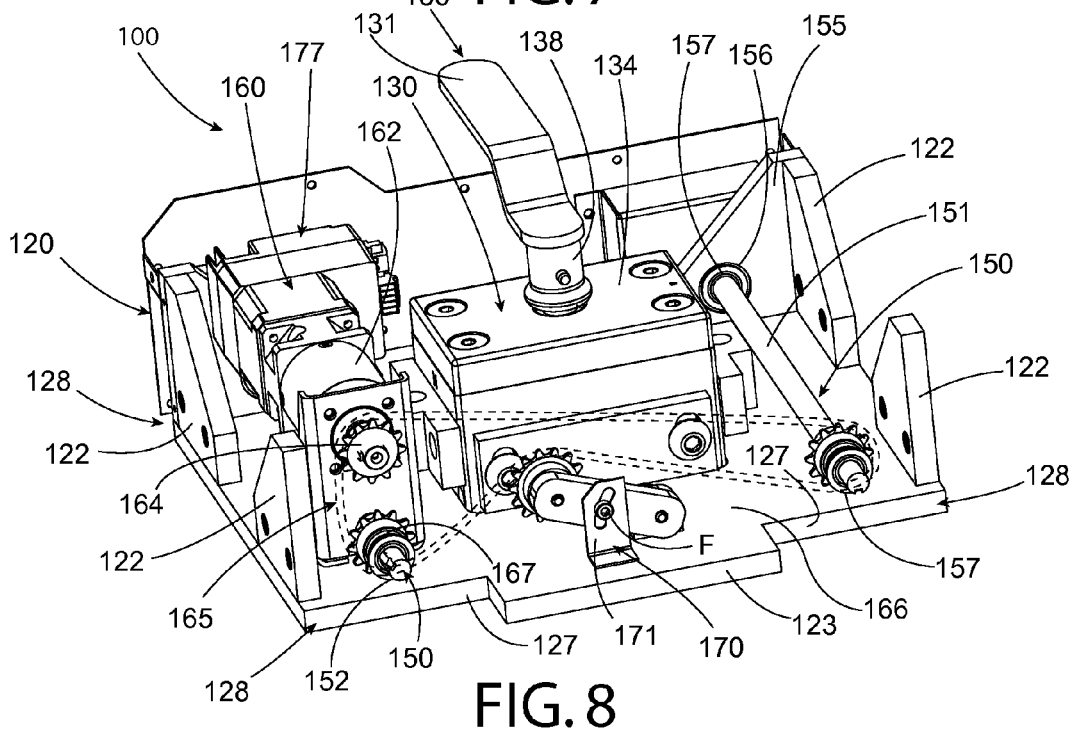
FIG. 8 is a perspective view similar to FIG. 7 with the wheels removed to show further details of the drive assembly.

In using magnets to provide the holding force, one or more magnets 132 may be used. The orientation and configuration of the magnet 132 may adapted based on the shape and size of the moving platform 120 and the mass or payload of the moving platform and its attendant components. For example, magnets 132 may be carried on brackets or outriggers attached at the periphery of moving platform 120 or a centrally mounted magnet 132 may be used as shown. As best seen in FIGS. 6-8, moving platform includes a magnet assembly 135 mounted at the center of floor 121. Magnet assembly 135 includes a single magnet 132 supported within a magnet housing 134. The magnetic force created by the magnet 132 may be selectively applied to the workpiece using a switch 136. Switch 136 may be an electrical switch controlling the current to a coil when an electro-magnet is used or a mechanical switch when a switchable permanent magnet is used as shown. In the depicted example, switch 136 is an arm that rotates the magnet between an on position where the magnet directs a magnetic force toward the workpiece and an off position where no magnetic force is applied. To accomplish this switching, magnet housing 135 includes stationary magnets 137 on either side of the magnet 132. The poles of stationary magnets are arranged such that one positive pole and one negative pole face inward toward magnet 132. In the off position, the positive pole and negative pole of magnet 132 are aligned with the opposite poles of the stationary magnets to cancel the magnetic force generated by magnet 132 effectively switching magnet 132 off. To turn magnet 132 on, the magnet 132 is rotated to move the poles out of alignment such that the magnetic force of magnet 132 is no longer cancelled. To facilitate switching a shaft 138 attached to magnet 132 extends upward from magnet housing 134 and includes a lever arm 139 extending radially outward therefrom. Housing 125 may include an opening through which the shaft extends to locate the lever arm 139 outside housing 125 such that switching of the magnet 132 may occur without opening housing 125.

According to the invention, as an alternative or in addition to applying a holding force, magnet 132 may be switched on to collect metal particles or other metal debris as the welding cart 100 moves over the workpiece WP. Once the welding operation is complete or interrupted, the magnet may be switched off to release the debris. For example, cart 100 may be held over a suitable receptacle, the magnet 132 switched off to release the debris into the receptacle for recycling or disposal.

Moving platform 120 includes a travel assembly 140 that supports the moving platform 120 over work piece W and facilitates movement of moving platform 120 relative to work piece W. Travel assembly 140 may include any type of propulsion system 145 including but not limited to active wheels, track assemblies, propellers, or other actuators. The propulsion system 145 moves the moving platform 120. Similar passive travel elements may be provided simply to maintain the moving platform 120 at a selected distance from the work piece W. For example, wheels, runners, rollers and the like may support the moving platform 120 above work piece W. Alternatively, propellers or other floats, or other buoyancy elements may be used to cause the moving platform 120 to hover or float at a set distance above work piece. In the example shown, travel assembly 140 includes wheels 142 that perform dual functions of supporting the moving platform 120 at a selected distance above the work piece and move the moving platform 120.

Wheels 142 are rotatably supported on floor 121 in any known manner including axle 150 shown. Wheels 142 may be provided at the periphery of floor 121 with notches 127 being formed within floor 121 at each corner 128 thereof to allow a portion of the wheel 142 to protrude below the platform a selected distance d. Wheels 142 may be constructed of any suitable material and have any configuration capable of supporting the platform 120 and allowing it to move. In the example shown, wheels 142 include a hub 144 that is constructed of a durable material including but not limited to various metals, plastics, ceramics or combinations thereof. In the example shown, hubs 144 are constructed of stainless steel. Each hub 144 includes at least one groove 146 formed in its outer surface 147. The groove 146 receives a band 148 therein. The band 148 is constructed of a material that provides traction and may have other desirable properties including high temperature resistance or chemical resistance. The band may be an elastomeric band to facilitate attachment of the band and provide an internal biasing force that holds the band 148 within groove 146. The material of the band 148 may provide traction or band 148 may include tractive elements on its outer surface, such as treads, tread blocks, abrasive material or combinations thereof to provide traction. The type of tractive elements 149 may vary depending on the operating conditions of the cart 100. To that end, bands 148 having different tractive elements 149 may be interchanged depending on the operating conditions.

In the example shown, a silicon material is used in the bands 148 shown. Silicon provides improved traction, is flexible and has high temperature resistance. Bands 148 may be replaced easily if they wear out or are damaged during the welding process by stretching the brand over the hub 144.

Wheels 142 may be supported in pairs on axles 150. In the example shown, a first axle 151 is provided at a first end of platform 120 and a second axle 152 is provided at a second end of platform 120. Axle supports, generally indicated at 155, extend upward from floor 121 adjacent to notches 127. Axle supports 155 may have any shape or configuration including the triangular shape shown. Axle supports 155 include an axle opening 156 through which each axle 150 extends. Axles 150 may be rotatably supported within these openings 156 by a suitable bearing 157 including but not limited to rolling element bearings and the like. Wheels 142 are rotatably fixed to axles 150 in any known manner, including but not limited to pinning or keying (shown) the hub 144 to axle 150, such that rotation of the axle causes rotation of the wheels 142. In the example shown, all four wheels 142 are rotatably fixed to the axles 150 such that all four wheels 142 are driven.

Propulsion system 145 includes a motor assembly 160 (FIGS. 7 and 8) coupled to the travel assembly 140 to selectively cause the moving platform 120 to move relative to the work piece W. In the example shown, motor assembly 160 includes a motor 162 that drives all four wheels 142. Motor 162 may be coupled to each wheel 142 independently or as shown motor 162 may be coupled to each axle 150 to drive all four wheels 142. Any suitable transmission may be used to couple axles 150 to motor 162. In the example shown, a coupler assembly 165 is provided to transfer rotation of a motor shaft 163 to axles 150. Coupler assembly 165 includes a flexible coupler 166, such as a chain or belt, that extends from drive shaft 163 to axles 150. To connect coupler 166 to these components a drive cog 164 is supported on drive shaft 163 and an axle cog 167 is supported on each axle 150. Cogs 164,167 are located in a common vertical plane to facilitate attachment of coupler 166. Each cog 164,167 has plural radially extending teeth to engage the coupler 166. In the example shown, coupler 166 is a timing chain. Teeth T of cogs 164,167 may be equally spaced or a differential may be created between the drive cog 164 and axle cogs 167 as needed. A tension assembly 170 may be provided to maintain tension on coupler 166. In the example shown, tension assembly 170 includes a tension bracket 171 supported on floor 127 and extending upward therefrom. A tension arm 172 is pivotally attached to tension support 171 by a fastener F. A slot 173 may be provided in tension arm to permit adjustment of the position of tension arm 172. As shown, slot 173 may be arcuate to move tension arm in the vertical and horizontal position simultaneously to provide appropriate adjustment. Tension arm 172 includes a tension cog 175 supported on one end. A counterweight when pivotal attachment of the arm 172 to bracket occurs between the ends of arm 172. It will be appreciated that counterweight may be replaced with a spring, band or other biasing member to apply a desired tensioning force. The biasing force may be changed by using a different weight or a spring or other biasing member that generates a different biasing force may be selected. In the example shown, the tension arm 172 is pivotally attached to floor 121 at a pivot bracket 176. The tension cog 175 is positioned by rotating the arm 172 about pivot bracket 176 and held in an appropriate tensioning position by fastener F. The operator may pivot the arm 172 on bracket 176 and also move it within slot 173 to position tension cog 175 relative to coupler and apply the desired tension thereto. Once positioned, fastener F is tightened to tension support 171 to lock the tension cog 175 in the desired position.

Operation of the motor assembly 160 drives wheels 142 to cause moving platform 120 to travel in one or more directions. In the example shown, motor assembly 160 rotates in one direction move platform 120 along in a travel direction T. Reversal of the motor will cause the platform to move in a direction reverse to the travel direction T shown. A motor controller 177 may be provided to adjust the travel speed, direction, or other characteristics of the travel assembly 145. A motor controller input 178 may be provided to facilitate adjustment by the operator. In the example shown, controller input 178 extends from the back panel of housing 125 (i.e. away from implement) to allow adjustment while cart 100 is in operation. Controller input may include one or more input devices 179 including but not limited to a keypad, slider, switch, or knobs. Alternatively, one or more controllers may be connected to cart 100 by a wired or wireless connection. For example, a connector C may be provided for a pendant or other external controller that can control one or more of the drive assembly, implement position, or implement oscillation.

Figure 5:
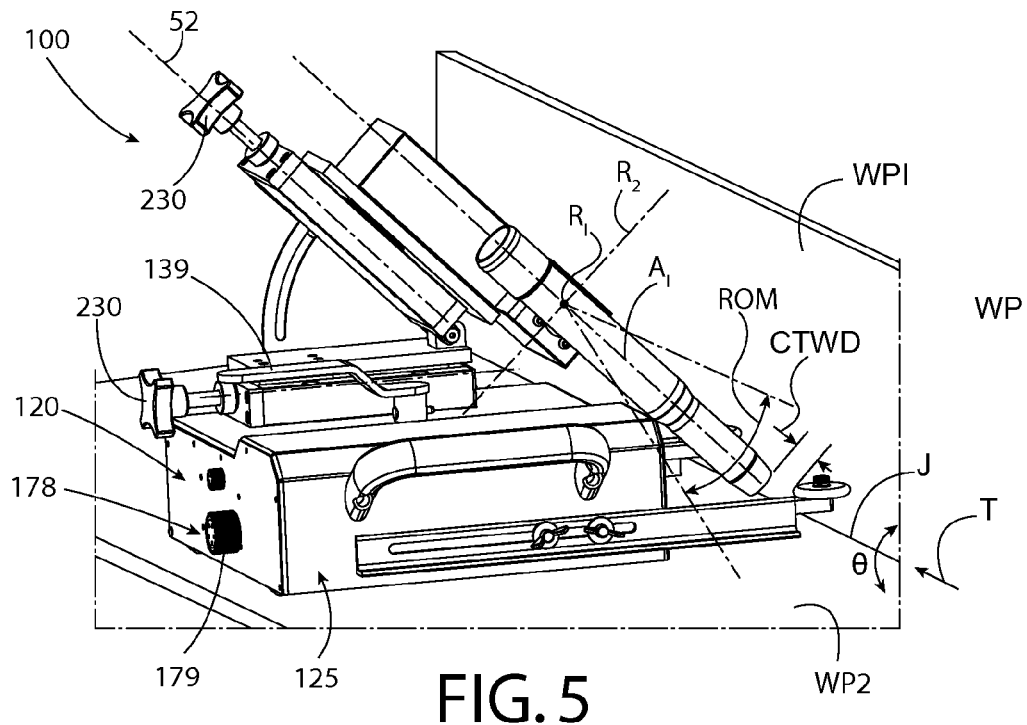
FIG. 5 is a rear perspective view similar to FIG. 4 showing details of the operation of the welding cart.

As referenced above, an implement 185 is supported on the moving platform 120. The implement 185 is capable of performing a welding operation. As best shown in FIG. 5, implement 185 is supported on moving platform 120 such that it has an uninterrupted line of sight to the work piece WP. In the example shown, implement 185 is a MIG welding torch and includes a power supply 181 that provides power to implement 185 for generating an arc. Welder 180 further includes a wire supply 182 that provides wire to the implement 185. Wire feeder 182 may draw wire W from an external supply or a wire supply may be provided on platform 120. In addition, welder 180 may include an inert gas supply 183 that provides shielding gas to the implement 185. Optionally, if submerged arc welding is performed, welder 180 may include a flux supply. Other optional components commonly used in other welding operations may be provided as part of the welder, as well. Power supply 181 and wire supply 182 may be provided remotely of cart 100 (as shown) or supported on moving platform 120. In either case, a conduit 188 may be provided to provide electrical and fluid connections along with the wire or other consumables required to implement 185.

Implement 185 is supported on a positioning assembly, generally indicated by the number 200, to maintain the implement 185 at a selected position relative to the work piece WP. Positioning assembly 200 includes a pair of positioning cross slides 210 that allow adjustment of the implement position along first slide plane $S_1$ and second slide plane $S_2$, as discussed more completely below. Cross slides 210 may be manually actuated, as shown, or motorized for automated positioning of the implement. First slide 211 is fixed in a horizontal orientation and is used to adjust the distance of the implement 185 from the upstanding portion of workpiece WP1, a wall or other vertical plane along plane S1. The second cross slide 212 is attached to first slide 211 and rotates about a pivot point 213 so that the angle can be set anywhere from horizontal to vertical. Second slide 212 defines a second slide plane $S_2$ along which the position of implement 185 is adjusted. Second slide 212 is locked in place by a second clamp 214, such as an adjustable handle or other type of fastener. In the example shown, second clamp 214 clamps to a thin sheet or plate 215 fixed to first slide 211. In this way, plate 215 moves with first slide 211.

Figure 2:
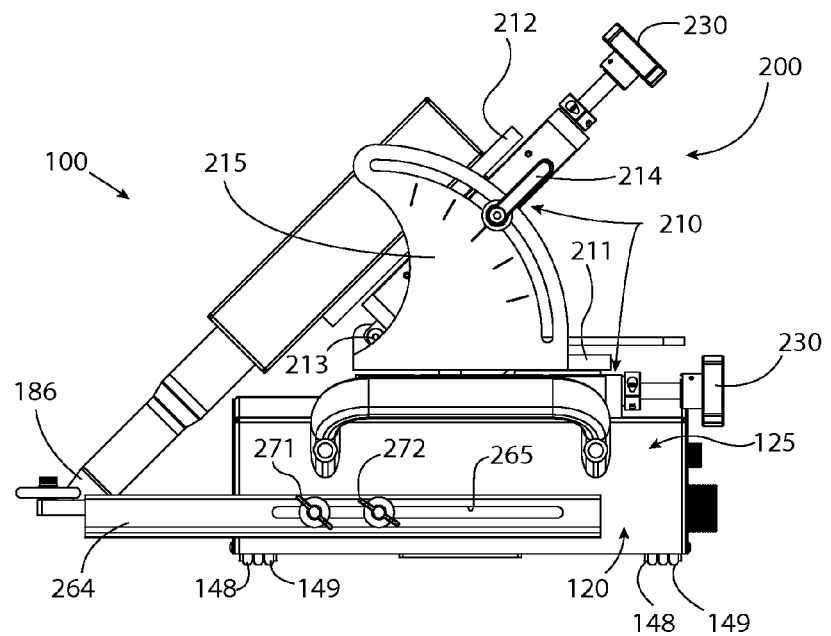
FIG. 2 is a side view thereof.
Figure 3:
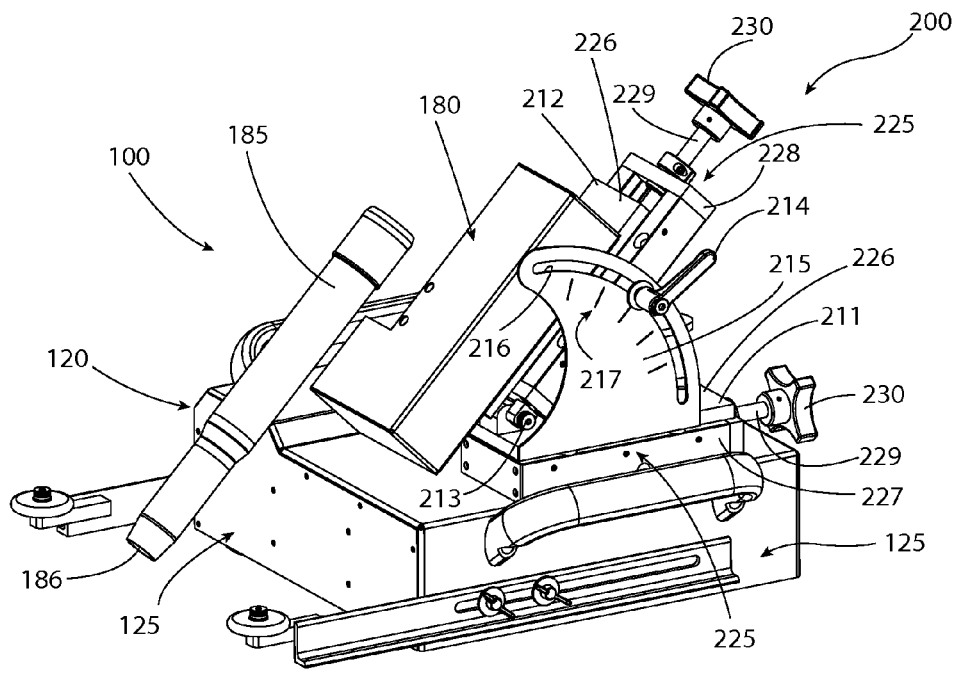
FIG. 3 is a front perspective view thereof.
Figure 4:
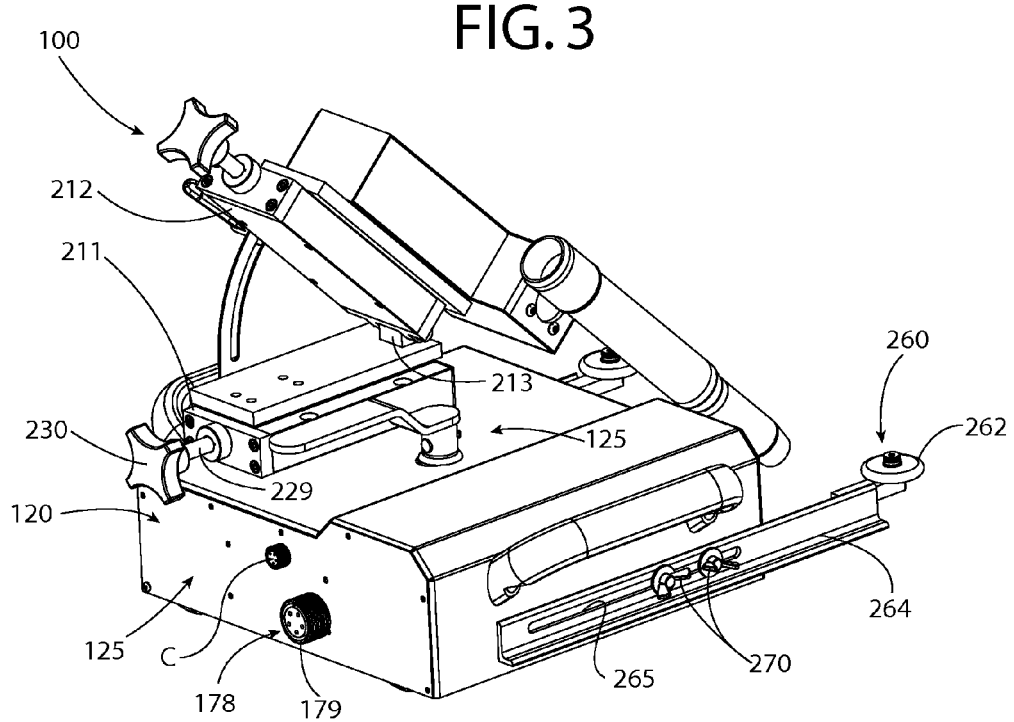
FIG. 4 is a rear perspective view thereof.
Figure 9:
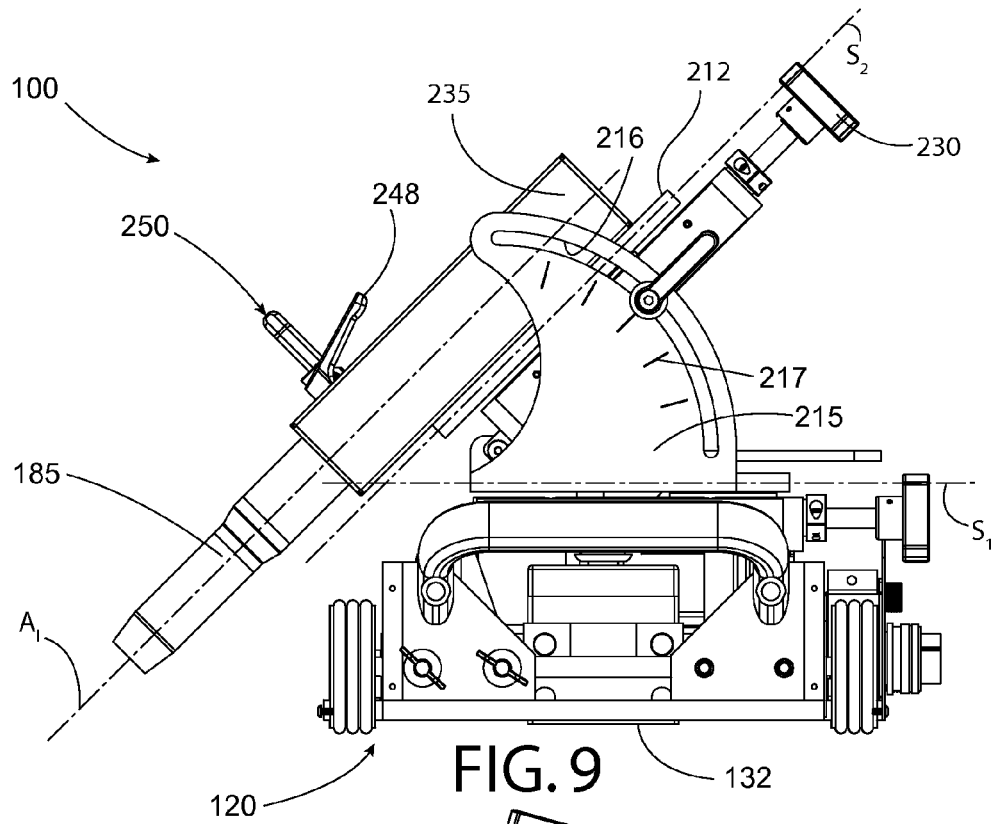
FIG. 9 is a side view of a welding cart according to the invention showing angular adjustment of the torch to a first position.
Figure 10:
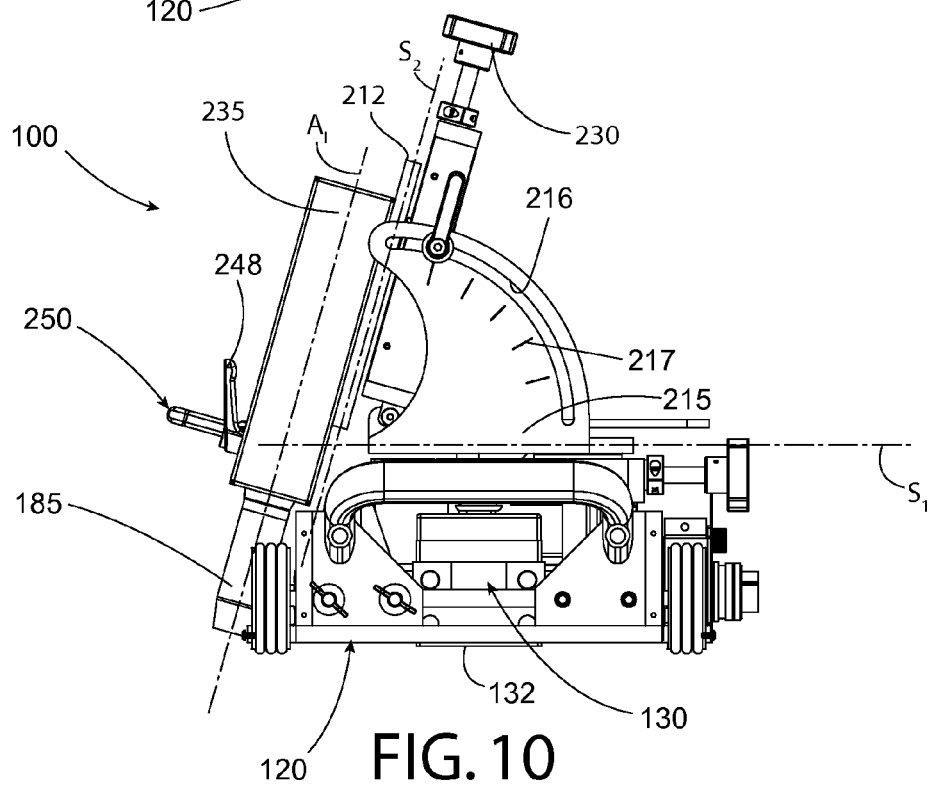
FIG. 10 is a side view of a welding cart according to the invention showing angular adjustment of the torch to a second position.

In one mode of operation, second slide 212 would be oriented parallel to implement (45 degrees in the example shown in FIGS. 2 and 5) and as a result would be used to adjust the distance between the implement tip 186 and the workpiece WP, often referred to as the contact tip to work distance CTWD in a welding operation (FIG. 5). In this mode of operation, two precision adjustments are provided, horizontal and CTWD. In another mode of operation second slide 212 would be oriented vertically. In this mode, the precision adjustment would be horizontal and vertical. To adjust the CTWD, the operator would need to adjust both the horizontal and vertical slides. In the example shown, second slide 212 is provided on pivot 213 to allow angular movement of the second slide 212 to provide adjustment along planes intermediate to and inclusive of the horizontal and vertical planes along second slide 212. As an example of this adjustment, two angular positions are shown in FIGS. 9 and 10. Angular adjustment may be used to align second slide 212 and implement as desired for a particular welding operation and/or workpiece configuration. As shown in FIGS. 9 and 10, second slide and implement are aligned such that the axis of implement $A_I$ is parallel to second slide plane $S_2$ allowing the contact to tip adjustment discussed earlier. In other embodiments, implement axis may be oriented in a non-parallel position.

Slides 210 may be of any type suitable for providing adjustment of the position of the implement 185. In the example shown, linear slides are used with each slide 211,212 defining a respective slide plane. For example, first slide 211 defines a first slide plane 221 that is horizontal, and second slide 212 defines a second slide plane 222. As discussed, second slide 212 may be mounted to form a vertical plane. Or, as shown, second slide 212 may be provided on a pivot 213 to allow angular adjustment of second slide plane 222. In the example shown, plate 215 includes a slot 216 that provides angular adjustment between 0 and 90 degrees. It will be understood that other angular ranges of motion may be provided by extending or shortening slot 216. A scale 217 indicating angular position in degrees, radians, or other desired measurement may be provided on plate 215 to assist the user in positioning second slide 212.

In the example shown, each slide 211,212 is a linear table 225 having a mounting plate 226 mounted on a positioning screw 227, which is rotatably supported in a table frame 228. In an automated system, screw 227 may be rotated by a motor to adjust the position of implement 185 by each slide 210. In the example shown, manual adjustment is achieved by a knob 230. In this example, an unthreaded shank of screw 227 extends outward of table frame 228 and knob 230 is mounted on the end of shank 229.

Figure 11:
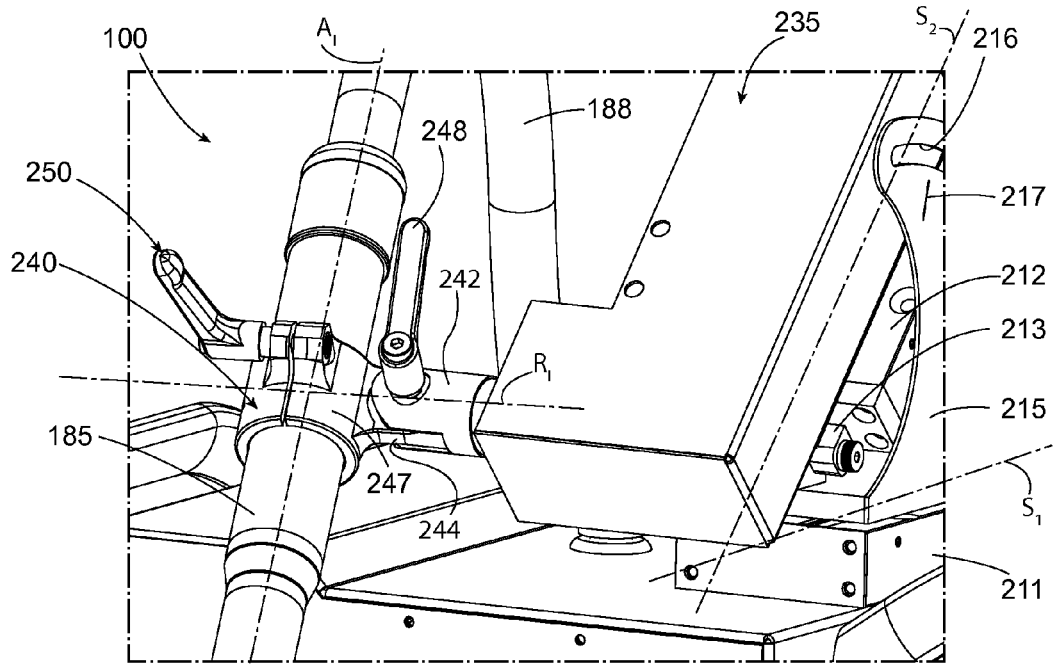
FIG. 11 is an enlarged view showing details of a torch mounting adjustment assembly.

An implement support generally indicated by the number 235 may be attached to second slide 212, which in turn is supported on first slide 211 to provide adjustment of the implement position. With reference to FIG. 11, implement support 235 may include an implement mount, generally indicated at 240, that provides additional adjustment of the position of the implement 185. Implement mount 240 may be any suitable bracket that supports implement 185, and may or may not provide further adjustment of the implement position.

Figure 12:
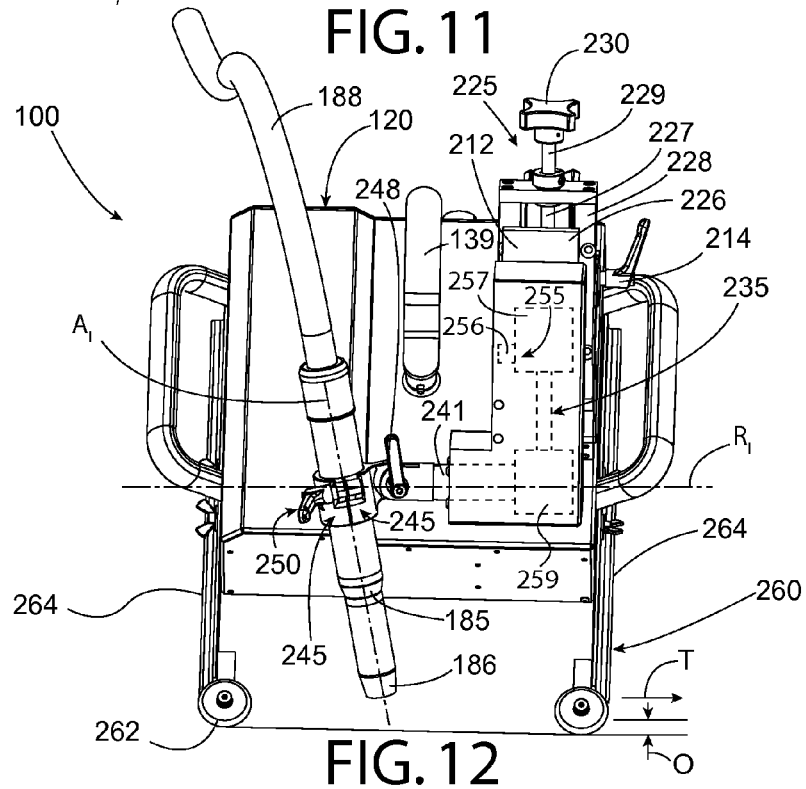
FIG. 12 is top view of a welding cart according to the invention.

In the example shown, adjustment is provided via mount 240. Mount 240 includes a stem 241 that extends from implement support 235. Stem 241 may be rotatably mounted to the second slide and extend parallel to the direction of travel T (FIG. 12). Stem 241 defines an axis $R_I$. A clevis 242 may be supported on stem 241. In the example shown, stem 241 is a drive shaft extending from oscillation motor assembly 255 described more completely below. Clevis 242 also provides angular adjustment of the implement 185 allowing the user to set a lead/lag angle as described more completely below. An implement clamp 245 may be supported on clevis 242, for example, by a tongue 244 that extends radially outward from clamp 245. Tongue 244 is pivotally mounted within clevis 242 to provide angular adjustment of implement's position along an axis $R_2$ perpendicular to axis $R_I$. When axis $R_I$ is parallel to the direction of travel T, the angular adjustment changes the lead/lag angle of the tip 186 of implement 185 relative to workpiece WP. A first locking handle 248 is provided to fix the angular position of implement relative to axis $R_2$ by applying a clamping force to stem 241 and tongue 244. In the example shown, the lead lag pivot axis $R_2$ is formed by the threaded end of first locking handle 248.

Implement clamp 245 defines an implement axis $A_I$. Clamp 245 includes a circular clamping member that has ends 247 that may be selectively squeezed together to clamp the implement 185 in a selected position. Implement 185 may be released to slide implement toward or away from workpiece WP along axis $A_I$. Implement 185 may also be rotated about axis $A_I$, as needed. Ends 247 of clamp 245 are squeezed or released by a second locking handle 250.

According to another aspect of the invention, cart 100 may include an oscillation motor assembly, generally indicated at 255, to selectively move the tip of implement in a selected range of motion. In the example shown, oscillation motor assembly 255 is operatively attached to stem 241 to rotate implement 185 about the axis $R_I$ defined by stem 241. The range of motion ROM may be 0-360 degrees of rotation or any portion thereof. Implement may be moved under the direction of a controller through any portion of the whole of the range of motion, and as in the example shown, oscillated back and forth about axis $R_I$. In the example shown in FIG. 5, with the tip 186 directed at a joint between workpiece WP1 and workpiece WP2 oscillation range of motion ROM is about 5-10 degrees above and below the axis of the implement $A_I$ when it is aligned with joint J. The range of motion and oscillation frequency may be automatically controlled by oscillation motor assembly or selected by the operator through an oscillation input 256. Oscillation input 256 may include any known device for selecting at least one of the frequency and range of motion for the oscillation motor 257. A gear box 259 may also be provided to limit the range of motion or change the direction of rotation. In the example shown, gear box 259 is a 90 degree gear box used to couple a motor 257 aligned with slide axis S2 and provide rotation perpendicular to this axis. In the example shown, stem 241 extends from gear box 259.

To perform, the welding operation on the joint, a tracking sensor, generally indicated at 260, is provided to maintain the position of the implement I relative to the workpiece WP or other point of reference for the travel of the moving platform 120. In the example shown, tracking sensor 260 is a pair of rollers 261,262 that contact a perpendicular surface, such as a wall or when the workpiece WP includes perpendicular faces, the upstanding face WP1 forming the joint may be used. The roller positions are adjustable and may be set up with the first roller 261 slightly closer to the platform 120 than the second roller 262. In the example shown, the first roller 261 is at the front of platform 120 and second roller 262 is at the rear of platform 120. The offset O between first roller 31 and second roller 32 angles platform 120 into the wall or upstanding portion of workpiece WP. This assures that as platform 120 travels it hugs the wall even if the wall contains a slight curvature.

Rollers 261,262 are mounted on arms 264 that attach to moving platform 120. In the example shown, arms 264 are attached to housing 125. The position of rollers 261,262 relative to wall or workpiece is adjustable in the example shown along slots 265 formed in each arm 264. One or more fasteners 270 may be provided to fix the position of the arms 264 relative to housing 125. Any fastener may be used including but not limited to the thumb screws 271,272 shown.

Figure 1:
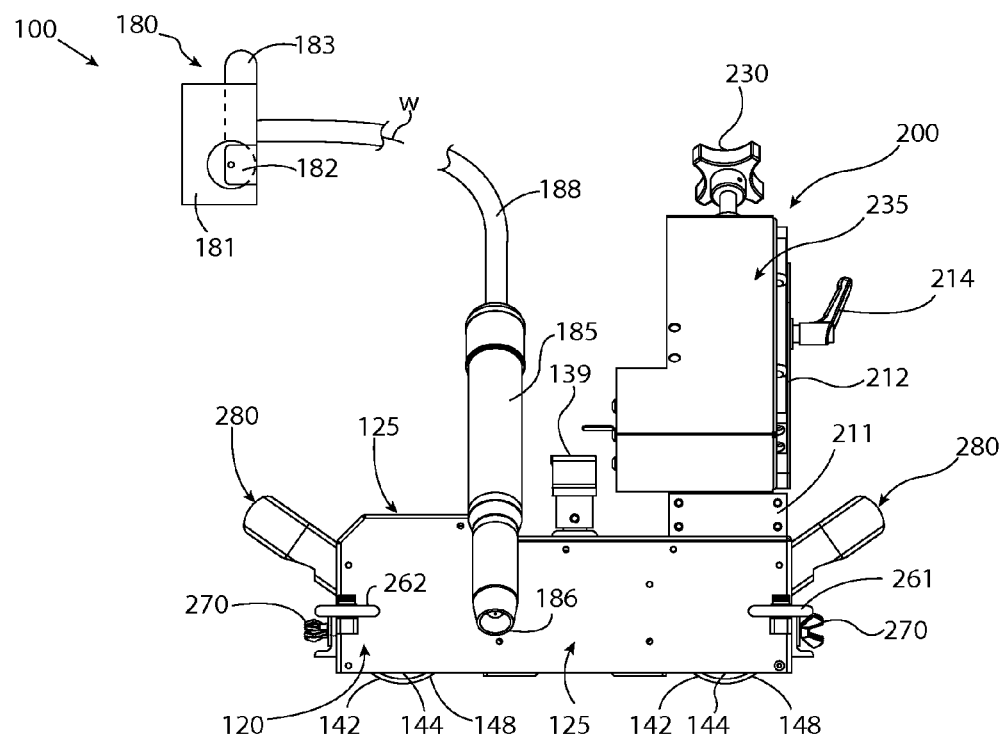
FIG. 1 is a front view of a welding cart according to the invention.

To facilitate positioning of the moving platform 120 relative to workpiece WP one or more handles 280 may extend outward from housing. In the example shown, a pair of generally u-shaped handles may extend outward and upward from front and rear sides of platform 120 as best seen in FIG. 1.

While principles and modes of operation have been explained and illustrated with regard to particular embodiments, it must be understood that this may be practiced otherwise than as specifically explained and illustrated without departing from its spirit or scope.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

Specific embodiments of an innovation are disclosed herein. One of ordinary skill in the art will readily recognize that the innovation may have other applications in other environments. In fact, many embodiments and implementations are possible. The following claims are in no way intended to limit the scope of the subject innovation to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the subject innovation has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (e.g., enclosures, sides, components, assemblies, etc.), the terms (including a reference to a "means") used to describe such elements are intended to correspond, unless otherwise indicated, to any element which performs the specified function of the described element (e.g., that is functionally equivalent), even though not structurally equivalent to the disclosed structure which performs the function in the herein illustrated exemplary embodiment or embodiments of the innovation. In addition, while a particular feature of the innovation may have been described above with respect to only one or more of several illustrated embodiments, such feature may be combined with one or more other features of the other embodiments, as may be desired and advantageous for any given or particular application. Although certain embodiments have been shown and described, it is understood that equivalents and modifications falling within the scope of the appended claims will occur to others who are skilled in the art upon the reading and understanding of this specification.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A cart adapted to perform a welding operation on a workpiece, the cart comprising:
a moving platform;
a first slide supported on the moving platform defining a first slide plane; a second slide pivotally attached to moving platform, the second slide defining a second slide plane;
a clamp engagable with the second slide to hold a pivotal position of the second slide at a selected angle relative to the moving platform;
an implement supported on the first slide and second slide, wherein operation of the first slide and the second slide move the implement to a selected position relative to the workpiece.

2. The cart of claim 1, wherein the movable platform includes at least one wheel connected to a motor; the at least one wheel including a hub defining a groove, an elastomeric band mounted on the hub within the groove, wherein the elastomeric band has an outer surface that extends radially outward of the groove to engage the first workpiece.

3. The cart of claim 2, wherein the elastomeric band includes a silicone material.

4. The cart of claim 2, wherein the elastomeric band is an o-ring.

5. The cart of claim 1, wherein the movable platform includes a holder assembly adapted to apply an attractive force drawing the movable platform toward the first workpiece.

6. The cart of claim 5, wherein the holder assembly includes a magnet, wherein the magnet is selectively engaged to apply the attractive force.

7. The cart of claim 6, wherein the holder assembly includes an arm attached to the magnet, the arm being rotatable between a first position where a magnetic force generated by the magnet is directed toward the first workpiece, and a second position where the magnetic force of the magnet is cancelled.

8. The cart of claim 7, wherein the moving platform has an upper surface and a lower surface, wherein the arm is rotatably mounted on the moving platform and extends upward from the upper surface thereof.

9. The cart of claim 1, wherein the moving platform includes a motor assembly supported on the moving platform, and a pair of axles rotatably supported on the moving platform, wherein each axle carries a pair of wheels; a chain drive interconnecting each axle to the motor assembly, wherein operation of the motor assembly causes all of the wheels to rotate.

10. The cart of claim 9, wherein the moving platform further includes a holder assembly supported on the moving platform between the axles and above a lower extremity of the wheels.

11. The cart of claim 9, wherein the moving platform includes a solid floor defining a perimeter, wherein the perimeter includes a cutout adjacent to each end of the floor, wherein each wheel is located within the cutouts with a portion thereof extending downward of the floor.

12. The cart of claim 1 wherein the moving platform includes a first axle and a second axle, a first pair of wheels supported on the first axle and second pair of wheels supported on the second axle; a drive assembly including a drive motor having a drive shaft connected to the first axle and the second axle to selectively drive the first and second axle.

13. The cart of claim 12, wherein the drive shaft carries a drive gear, the first axle has a first axle gear, the second axle has a second axle gear; wherein a timing chain couples the drive gear to the first axle gear and second axle gear.

14. The cart of claim 13 further comprising a tensioner assembly including a tension gear supported on a tension bracket between the first and second axle and engageable with the timing chain, the tension gear being moveable on the tension bracket to apply a selected tension to the timing chain, and a tension fastener adapted to hold the tension gear at a selected position to maintain the selected tension.

15. The cart of claim 14, wherein the tensioner assembly further includes a tension arm that is pivotally mounted on the bracket by the tension fastener and wherein the tension gear is supported on a first end of the tension arm and a counter weight is supported on a second end of the tension arm.

16. The cart of claim 1, wherein the second slide is pivotally mounted on the first slide.

17. The cart of claim 1, wherein the first slide and the second slide each include a linear table having a platform mounted on an actuator, wherein rotation of the actuator moves the platform along a plane.

18. The cart of claim 17, wherein the rotation of each actuator is controlled manually by a knob.

19. A cart adapted to weld a joint between a first workpiece and a second workpiece oriented at an angle to the first workpiece, the cart comprising:
a moving platform;
a first slide supported on the moving platform, the first slide defining a first slide plane;
a second slide pivotally attached to the first slide, the second slide defining a second slide plane;
a clamp engagable with the second slide to hold a pivotal position of the second slide at a selected slide angle relative to the moving platform;

an implement defining an implement axis, the implement being supported on the second slide, wherein the implement is movable to a selected position along the first slide plane and second slide plane by operation of the first slide and second slide;

wherein the slide angle is aligned with the implement axis, and wherein movement along the second slide plane with the slide angle aligned with the implement axis adjusts a contact tip to work distance.

20. The cart of claim 19 further comprising an implement mounting assembly including a stem extending outward from the second slide parallel to a direction of travel for the mobile platform, an implement clamp supported on the stem and adapted to support the implement, wherein the stem is pivotable to a selected work angle and the implement clamp is pivotable to a selected lead/lag angle of the implement.

21. The cart of claim 20 wherein the implement clamp includes a clevis that receives a tongue extending from the implement clamp to pivotally attach the implement clamp to the stem, an adjustment handle extending through the clevis and tongue to selectively lock the angular position of the tongue relative to the clevis.

22. The cart of claim 20 further comprising an oscillation motor assembly including an oscillation motor, wherein the stem is a drive shaft of the oscillation motor, wherein the oscillation motor selectively rotates the stem through a reciprocal range of motion.

23. A cart adapted to perform a welding operation on a joint between a first workpiece and a second workpiece oriented at an angle to the first workpiece, the cart comprising:

a moving platform;

a first slide supported on the moving platform and fixed in a horizontal position;

a second slide pivotally attached to the first slide, the second slide defining a second slide plane;

a clamp engagable with the second slide to hold a pivotal position of the second slide at a selected slide angle relative to the first slide;

an implement defining an implement axis, the implement being supported on the second slide, wherein the implement includes a welding torch having a contact tip adapted to apply a weld to the joint, wherein operation of the first slide adjusts a position of the contact tip in the first plane and operation of the second slide adjusts the position of the contact tip in the second plane, and wherein the slide angle is selected to align it parallel to the implement axis to provide a contact tip to work distance adjustment by operation of the second slide.

* * * * *